(12) United States Patent
Ott et al.

(10) Patent No.: US 10,323,299 B2
(45) Date of Patent: Jun. 18, 2019

(54) RECOVERING RARE EARTH METALS FROM MAGNET SCRAP

(71) Applicant: Iowa State University Research Foundation, Inc., Ames, IA (US)

(72) Inventors: Ryan T. Ott, Ames, IA (US); Ralph W. McCallum, Santa Fe, NM (US)

(73) Assignee: Iowa State University Research Foundation, Inc., Ames, IA (US)

(*) Notice: Subject to any disclaimer, the term of this patent is extended or adjusted under 35 U.S.C. 154(b) by 250 days.

(21) Appl. No.: 14/999,802

(22) Filed: Jun. 28, 2016

(65) Prior Publication Data
US 2017/0016088 A1    Jan. 19, 2017

Related U.S. Application Data

(60) Provisional application No. 62/231,760, filed on Jul. 15, 2015.

(51) Int. Cl.
  *C22B 7/00* (2006.01)
  *C22B 59/00* (2006.01)
  *C22C 28/00* (2006.01)

(52) U.S. Cl.
  CPC .......... *C22B 59/00* (2013.01); *C22B 7/001* (2013.01); *C22C 28/00* (2013.01); *Y02P 10/214* (2015.11)

(58) Field of Classification Search
  CPC .......... C22B 7/001; C22B 59/00; C22C 28/00
  See application file for complete search history.

(56) References Cited

U.S. PATENT DOCUMENTS

| | | | | |
|---|---|---|---|---|
| 4,105,983 A | * | 8/1978 | Barten | H01J 9/703 335/212 |
| 4,622,205 A | * | 11/1986 | Fouts | C22C 11/06 420/566 |
| 5,129,945 A | | 7/1992 | Lyman | 75/416 |
| 5,238,489 A | | 8/1993 | Lyman | 75/743 |
| 5,437,709 A | * | 8/1995 | Ellis | C22B 59/00 75/581 |

(Continued)

FOREIGN PATENT DOCUMENTS

CN    103469041 A  * 12/2013
JP    02-080530       3/1990

(Continued)

OTHER PUBLICATIONS

CN 103469041—A machine translation of the description (Year: 2013).*

(Continued)

*Primary Examiner* — Tima M McGuthry-Banks

(57) ABSTRACT

A method is provided for treating a rare earth metal-bearing scrap material by melting an extractant selected from the group consisting of bismuth (Bi) and lead (Pb) and contacting the melted extractant and the scrap material at a temperature and time to recover at least one of the light rare earth metal content and the heavy rare earth metal content as a metallic extractant alloy, which can be subjected to vacuum distillation or sublimation to recover the rare earth metal(s). The method can be practiced to recover the light rare earth metal content and the heavy rare earth metal content concurrently in a one-step process or separately and sequentially in a two-step process.

28 Claims, 4 Drawing Sheets

(56) References Cited

U.S. PATENT DOCUMENTS

| | | | | |
|---|---|---|---|---|
| 6,149,861 A | * | 11/2000 | Kaneko | B22F 1/0088 |
| | | | | 148/103 |
| 9,044,810 B2 | * | 6/2015 | Nomura | B22F 7/062 |
| 9,725,788 B2 | * | 8/2017 | Ott | C22B 23/00 |
| 2011/0023660 A1 | | 2/2011 | Okabe | 75/392 |
| 2013/0283977 A1 | | 10/2013 | Lakshmanan | 75/743 |
| 2014/0291161 A1 | * | 10/2014 | Awazu | C25C 3/34 |
| | | | | 205/348 |

FOREIGN PATENT DOCUMENTS

| | | |
|---|---|---|
| JP | 2684971 | 1/2014 |
| JP | 2014-051731 | 3/2014 |

OTHER PUBLICATIONS

Schwartz, Harold. "Bismuth" and "Lead." Prokon. ShowMe Software. 2 pages. (Year: 1998).*
U.S. Appl. No. 14/545,994, filed Jul. 15, 2015, Ryan T. Ott.

* cited by examiner

| CMI-3-1-53 (1000 °C for 3 hours) |||||| 
|---|---|---|---|---|---|
| Mass Scrap (a) | wt.% Nd in scrap | Mass Nd in scrap | Mass of Bi charge | Wt. % Nd in Bi-RE alloy | Theor. Wt. % of Nd |
| 200g | 18.8 % | 36.06 g | 1124.1g | 3.98% | 3.11 % |
|  | wt. % Dy in scrap | Mass Dy in scrap |  | Wt. % Dy in Bi-RE alloy | Theor. Wt. % of Dy |
|  | 7.94 % | 15.88 g |  | 1.05 % | 1.39 % |

FIG. 3

RECOVERING RARE EARTH METALS FROM MAGNET SCRAP

RELATED APPLICATION

This application claims benefits and priority of U.S. provisional application Ser. No. 62/231,760 filed Jul. 15, 2015, the disclosure and figures of which are incorporated herein by reference.

CONTRACTUAL ORIGIN OF THE INVENTION

This invention was made with government support under Grant No. DE-AC02-07CH11358 awarded by the U.S. Department of Energy. The government has certain rights in the invention.

FIELD OF THE INVENTION

The present invention relates to a liquid metal extraction treatment of rare earth metal-bearing permanent magnet scrap, waste or other material to recover the rare earth metal content.

BACKGROUND OF THE INVENTION

As a result of the expanding use of rare earth-bearing materials in modern technology, such as, for example, in the form of rare earth-iron alloy magnetostrictive transducers, delay lines, variable frequency resonators and filters and rare earth-iron-boron alloy permanent magnets, the cost and environmental problems associated with their waste and scrap disposal have become an increasing concern. Additionally, the high cost of rare earth metals makes simple disposal of rare earth-bearing waste or scrap materials economically unattractive. Up to the present time, there have been no large scale operations to recover rare earth metals from scrap and waste materials.

One attempt at recovering rare earth metals from waste and scrap involves dissolution of the waste/scrap material in acid media followed by precipitation of a rare earth compound. The rare earth compound is converted to a rare earth trifluoride which is then reduced to rare earth metal by calcium reduction. U.S. Pat. No. 5,129,945 describes a recovery process of this type. Although the recovery process is effective, it is time consuming and requires the use of expensive non-recoverable reagents.

Another attempt at recovering rare earth metals from rare earth-transition metal materials has produced a process that promises to be less costly and more adaptable to a variety of scrap materials. This process is based on liquid-liquid or liquid-solid extraction technology depending upon the specific rare earth alloy scrap being processed. The process allows rare earth recovery without the expensive and time consuming acid digestion and fluoride reduction steps employed in the recovery process described in the preceding paragraph. Rare earth metals are recovered in this process using reagents which are essentially completely recycled. Thus, the waste stream is kept to a minimum. U.S. Pat. No. 5,238,489 describes a recovery process employing a combination of leaching and flotation to separate different rare earth scrap alloys in a scrap mixture from one another.

U.S. Pat. No. 5,437,709 describes a liquid metal extraction treatment of rare earth-transition metal alloy scrap, waste or other material to rare earth metal components, wherein the process recovers the light rare earth metal and heavy rare earth metal contents of the scrap together.

Since Dy is generally considered the most critical, as defined by reserves and costs of the rare earth metals used in $RE_2Fe_{14}B$ (where RE=a rare earth metal), development of a process that permits separation of Dy or other heavy rare earth metals together with or separate from Nd and Pr (light rare earth metals) in their metallic states from permanent magnet scrap is highly desirable to help address potential shortages of these rare earth metal(s). A separation process that yields the light and heavy rare earth metal contents in their metallic form also is preferred over separating processes that separate rare earth metals in their oxide forms, which requires further complicated chemical processing.

SUMMARY OF THE INVENTION

The present invention provides a method of treating rare earth metal-bearing permanent magnet scrap, waste or other material using a molten extractant selected from the group consisting of Bi and Pb to recover rare earth metal(s). An embodiment of the invention involves treating a rare earth metal-bearing scrap material by melting an extractant selected from the group consisting of bismuth (Bi) and lead (Pb) and contacting the melted extractant and the scrap material at a temperature and time to recover at least one of the light rare earth metal content and the heavy rare earth metal content. The method can be practiced to recover the light rare earth metal content and the heavy rare earth metal content concurrently in a one-step process or separately and sequentially in a two-step process.

An illustrative embodiment of the invention involves treating a rare earth metal-bearing scrap material that comprises a transition metal (e.g. Fe) a light rare earth metal (e.g. Nd and/or Pr) and a heavy rare earth metal (e.g. Dy and/or Tb). The method involves melting an extractant selected from the group consisting of bismuth (Bi) and lead (Pb) and contacting the melted extractant and the scrap material in a processing vessel at a temperature and time to recover the light rare earth metal content and the heavy rare earth metal content concurrently in a one-step process. The resulting extractant alloy containing both the light and heavy rare earth metal contents can be solidified. The extractant alloy can be subjected to vacuum distillation or sublimation to selectively remove the extractant to recover the light and heavy rare earth metals, which provide a high-value product for reuse in manufacture of rare earth-containing products (e.g., permanent magnets).

In another illustrative embodiment of the invention, a method involves treating a rare earth metal-bearing scrap material that comprises a transition metal (e.g. Fe) a light rare earth metal (e.g. Nd and/or Pr) and a heavy rare earth metal (e.g. Dy and/or Tb) using a two-step process. The method involves melting a first extractant preferably selected from the Group IIA metals of the Periodic Table, such as for example Mg, and contacting the scrap material and the molten extractant in a processing vessel at a temperature and time to recover the light rare earth metal content as a first extractant alloy (e.g. metallic alloy comprising Mg and the light rare earth metal(s)), leaving a remnant alloy rich in heavy rare earth metal content (e.g. Dy and/or Tb and Fe) in the processing vessel. The first extractant alloy can be cast and solidified, leaving the remnant alloy enriched in heavy rare earth metal(s). The first extractant alloy can be subjected to vacuum distillation or sublimation to selectively remove the first extractant (e.g. Mg) to recover the light rare earth metals for reuse in manufacture of rare earth containing products (e.g., permanent magnets).

Then, in a second step, the remnant alloy [transition metal(s) and remaining heavy rare earth metal(s)] and a molten second extractant selected from the group consisting of bismuth (Bi) and lead (Pb) are contacted in a processing vessel at a temperature and time to recover the heavy rare earth metal(s) as a second extractant alloy which is enriched in the heavy rare earth metal(s) (e.g. a metallic alloy comprising Bi and the heavy rare earth metal(s)). The remnant alloy can be solidified and subjected to vacuum distillation or sublimation to selectively remove the second extractant (e.g. Bi) to recover the heavy rare earth metal(s) for reuse in manufacture of permanent magnets.

The present invention is useful, although not limited to, treating rare earth-iron based alloy permanent magnet scrap or waste material to extract the heavy rare earth metal content (e.g. typically Dy, Tb, and Ho and also Er, Tm, Th, Yb, Lu and Y if present) separately from the light rare earth metal content (e.g. typically Nd, Pr, and Gd and also La, Ce, Pm, Sm, Eu, and Sc if present). For purposes of illustration and not limitation, the invention can be used to treat permanent magnet scrap compositions that comprise $RE_2Fe_{14}B$ (where RE=one or more a rare earth metals) that contain various amounts of Nd, Pr, and Dy as well as other compositions containing heavy rare earth metal(s).

The present invention will become more readily understood from the following detailed description taken with the drawings.

BRIEF DESCRIPTION OF THE DRAWINGS

FIG. 1A shows a processing vessel (e.g. a steel crucible) loaded with liquid extractant and a mesh box containing permanent magnet scrap pieces to be treated to recover the rare earth contents thereof and FIG. 1B shows a cast ingot.

FIG. 3 contains a table showing the results of the extraction and recovery of Nd and Dy in a Bi-RE extractant alloy.

DESCRIPTION OF THE INVENTION

Figure 1A:
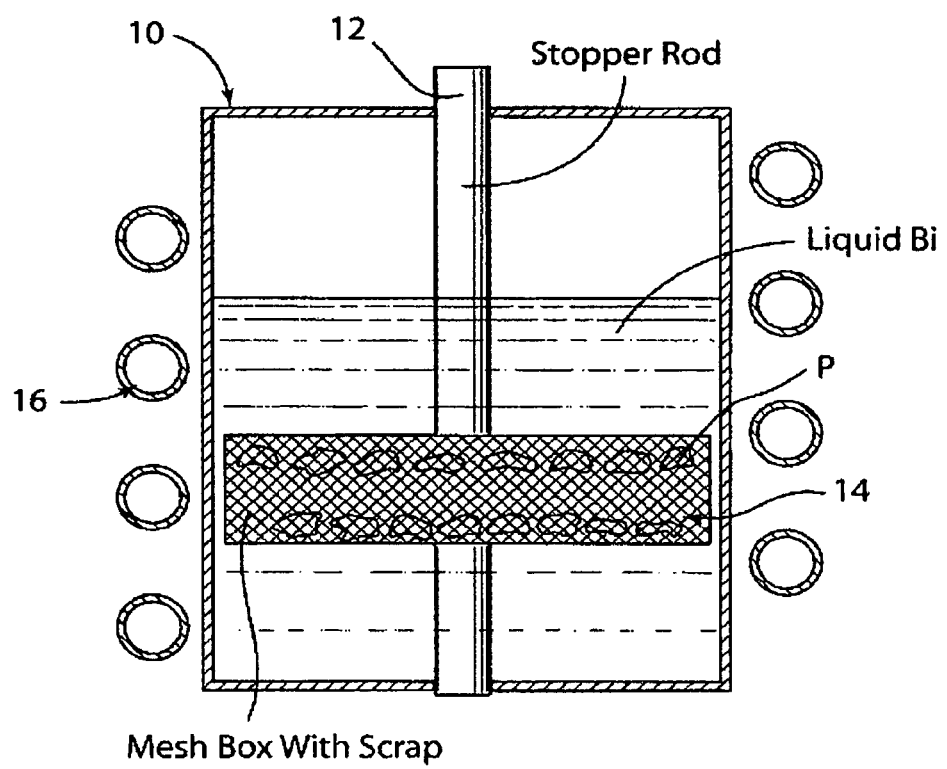
FIGS. 1A and 1B are schematic views of apparatus useful for practicing an embodiment of the invention where

The present invention involves a liquid metal extraction technique for treating rare earth metal-bearing permanent magnet scrap, waste, and other material to recover at least one of the light rare earth metal(s) and the heavy rare earth metal(s) for reuse in the manufacture of permanent magnets.

Rare earth-bearing scrap or waste material typically will comprises scrap or waste generated by one or more fabricating operations, either on-site or off site. The scrap or waste may optionally be segregated (graded) by the alloy composition; size, shape, and other factors. For example, fine pyrolytic rare earth-transition metal dust or powder (referred to as swarf) of like or similar composition can be segregated for treatment whereas, dry, bulky scrap or waste pieces of the same or similar composition can be segregated into one or more groups by size and shape for treatment.

Swarf typically will comprise fine powder or particulates in the particle size range of less than 50 microns produced by such fabrication operations as abrasive cutting and grinding. Both swarf and bulky scrap or waste pieces may be treated in the as-received condition; i.e. without cleaning. If desired, bulky scrap pieces optionally may be ground in suitable manner into particulates form (e.g. particle sizes less than 500 microns) to improve dissolution kinetics during treatment.

Although not so limited, the present invention can be used to treat a wide variety of binary, ternary, and other rare earth-transition metal alloy compositions. For purposes of illustration and not limitation, rare earth-transition metal scrap, waste and other material (e.g. $Nd_2Fe_{14}B$, $SmCo_5$, $Dy_{0.25}Tb_{0.75}Fe$, etc.) treatable in accordance with the invention typicall will comprise one or more transition metals such as Fe, Co, Ni, etc., one or more rare earth metals such as Nd, Dy, Tb, Pr, Sm, Ho, La, Ce, Eu, Gd, Er, Tm, Th, Lu, Y, and Sc, and other optional alloyants, such as B, Zn, Nb, Ga Al as well as other non-metallics and metallics that may be used for one reason or another in the alloy composition.

The rare earth metal-bearing scrap, waste and other material may include a mixture of the different rare earth transition metal alloy scrap or waste materials (i.e. having different compositions) resulting, for example, from fabrication operations used to form permanent magnets and other articles of manufacture. An illustrative mixed rare earth metal-bearing material might include, for example, $Nd_2Fe_{14}B$ permanent magnet scrap or waste particulates, $SmCo_5$ permanent magnet scrap or waste, particulates, and SiC and/or $Al_2O_3$ particulates grinding media. Such a mixture of scrap and waste particulates typically is received covered with residual. watersoluble organic oils and/or coolant which are employed in the previous fabrication operations (e.g. abrasive grinding and cutting). Such mixtures of scrap and waste material can be cleaned prior to the liquid metal extraction treatment pursuant to the present invention, although cleaning is optional in practicing the invention.

One-Step Embodiment

A one-step embodiment of the present invention involves treating a rare earth metal-bearing scrap material by melting an extractant selected from the group consisting of bismuth (Bi) and lead (Pb) and contacting the melted extractant and the scrap material at a temperature and time to concurrently recover both the light rare earth metal content and the heavy rare earth metal content in the extractant. The method can be practiced to recover the light rare earth metal content and the heavy rare earth metal content concurrently in a one-step.

For purposes of illustration and not limitation, the one-step embodiment can be used to treat rare earth metal-bearing scrap material that comprises a transition metal (e.g. Fe) a light rare earth metal (e.g. Nd and/or Pr) and a heavy rare earth metal (e.g. Dy and/or Tb). In this illustrative embodiment, a preferred extractant for use in practicing the one-step embodiment comprises Bi, although Pb also can be used in practice of the invention. For purposes of illustration, the extractant can comprise at least 50% by weight Bi with other metals such as Pb, Mg, Ca, and the like optionally being present in minor amounts (aggregating less than 50% by weight) in the Bi extractant. A preferred extractant comprises at least 75% by weight Bi. An even more preferred extractant comprises greater than 98% by weight Bi, such as an extractant which is greater than 98.5% by weight Bi and balance impurities. A Bi extractant with this purity is commercially available from Belmont Metals having an address at 330 Belmont Avenue Brooklyn, N.Y., 11207-4000.

An illustrative Pb extractant can comprise at least 50% by weight Pb with other metals such as Bi, Mg, Ca, and the like optionally being present in minor amounts (aggregating less than 50% by weight) in the Pb extractant. A preferred extractant comprises at least 75% by weight Pb. An even more preferred extractant comprises at least 98% by weight Pb, such as an extractant which is greater than 98.5% by weight Pb and balance impurities. A Pb extractant with this purity is commercially available from Belmont Metals having an address at 330 Belmont Avenue Brooklyn, N.Y., 11207-4000.

In practice of an illustrative one-step embodiment of the present invention, the rare earth metal-bearing scrap material is treated by liquid metal extraction in a processing vessel 10 (e.g. an induction heated crucible having stopper rod 12 in FIG. 1A) to selectively extract the rare earth metal(s) from solid scrap material (e.g. scrap pieces P in FIG. 1A) placed in the liquid metal extractant (e.g. liquid or molten Bi or Pb in FIG. 1A). Selective extraction is achieved by controlling the treatment temperature (temperature of molten extractant) to be a temperature where both the light and heavy rare earth metal(s) exhibit(s) relatively rapid solid state diffusion out of the scrap material and relatively high solubility in the extractant. In an illustrative embodiment, the treatment temperature is controlled using an induction coil 16 disposed around the processing vessel 10, FIG. 1A, although other heating means can be used to this same end. For purposes of illustration and not limitation, the rare earth-bearing scrap particulate material is disposed in one or more stainless steel mesh boxes 14 mounted on the stopper rod 12 for movement therewith and having open mesh sides that allows the liquid extractant access to the rare earth-bearing material (pieces P, FIGS. 1A, 1B).

The extracting temperature is controlled to be below the melting point (liquidus temperature) of the rare earth-bearing scrap material. When using Bi extractant, the Bi extractant can be used in the temperature range of greater than 271 degrees C. (Bi melting point degrees C.) to 1300 degrees C. A temperature of 700 to 1100 degrees C. is preferred for practicing the invention.

When using Pb extractant, the Pb extractant can be used in the temperature range of greater than 328 degrees C. (Pb melting point degrees C.) to 1200 degrees C. A temperature of 600 to 1000 degrees C. is preferred for practicing the invention.

For convenience and energy efficiency in practicing embodiments of the invention, the rare earth metal-bearing scrap material and the melted extractant are disposed, and contacted in a common melting vessel, such as a metallic (e.g. steel) or ceramic crucible under relative vacuum (e.g. 10 torr or other value) or inert gas (e.g. argon). However, the invention is not so limited and can be practiced, for example, by melting the extractant in a separate vessel and then contacting the scrap material and the melted extractant in a separate vessel or in one of the melting vessels.

Both the light and heavy rare earth metals dissolve as a solute in the molten extractant as a solvent to form an extractant alloy in the processing vessel. The extractant alloy is poured into a mold or other vessel and solidified. For example, the molten extractant alloy can be poured by opening stopper rod 12 into a suitable underlying melt-receiving vessel, such as mold M, FIG. 1B, for solidification to a desired shape. The cast and solidified extractant alloy contains extractant and the vast majority of the light and heavy earth metals present in the magnet scrap material. The cast and solidified extractant alloy is subjected to vacuum distillation or sublimation to selectively remove the extractant (e.g. Bi or Pb) from the extractant alloy to recover the light and heavy rare earth metals. These are high-value products for reuse in manufacture of permanent magnets.

Figure 2:
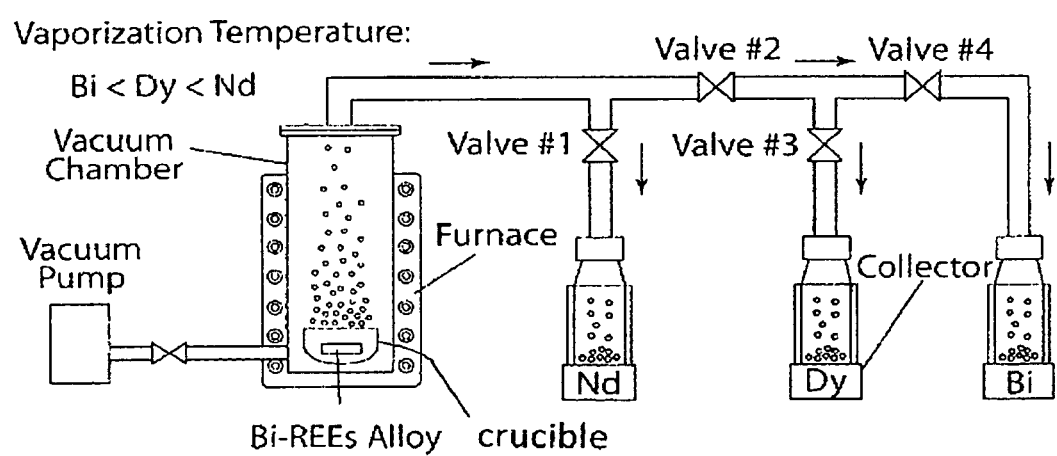
FIG. 2 is a schematic illustration of vacuum distillation of a Bi—Nd—Dy alloy to separate Bi, Nd, and Dy elemental constituents.

Vacuum sublimation can be conducted in a conventional distillation apparatus of suitable material (i.e. Ta, Fe, Mo, W, etc.) wherein the solidified extractant alloy is heated and melted (or the already molten melt) is subjected to a vacuum level effective to evaporate the lower vapor pressure metal (e.g. the Bi or Pb extractant) so as to leave the higher vapor pressure metal (e.g. rare earth metal(s)) dissolved in the extractant) for reuse. Vacuum distillation can be conducted in a conventional distillation apparatus wherein the solidified melt is heated and melted (or the already molten melt) is subjected to elevated temperature effective to evaporate the lower melting point metal (e.g. the Bi or Pb extractant) so as to leave the higher melting point metal (e.g. rare earth metal(s)) dissolved in the extractant) for reuse. The distillation process can also involve the vaporization of both the extractant metal (e.g., Bi or Pb) and the recovered rare earth metals (e.g., Nd or Dy) followed by condensation of the different metals at different temperatures in order to achieve separation, similar to fractional distillation. FIG. 2 illustrates schematically this distillation technique to selectively remove and separate Bi, Nd, and Dy constituents of a Bi—Nd—Dy extractant alloy designated "Bi-REEs Alloy" based on their different vaporization temperatures. The Bi-REEs Alloy is shown placed in a crucible residing in a vacuum chamber heated by a furnace, such as an induction furnace. The vacuum chamber is connected to a vacuum pump. The extractant alloy can be heated in the vacuum chamber under suitable vacuum, and the vaporized Bi, Dy, and Nd constituents are condensed and collected in respective Bi, Dy, and Nd collectors connected to the top of the vacuum chamber by the piping and the opened valves as shown.

For purposes of illustration and not limitation, a Bi—Dy alloy (e.g. Bi-49.5 atomic % Dy) can be preferably heated above 1400 degrees C. (e.g. 1540 degrees C.), in a tantalum crucible for four (4) hours at a pressure of about $5 \times 10^{-5}$ torr to selectively separate the Bi and Dy alloy constituents for collection at different temperatures in the collectors.

A solidified remnant alloy remains in the processing vessel after the melted Bi extractant containing the light and heavy rare earth metals is cast and solidified in the mold or other vessel. The remnant alloy left in the processing vessel typically is based on (having a majority of) the transition metal of the scrap (e.g. Fe based) and includes a minor amount (e.g. less than 3 by weight %) of the residual light and heavy rare earth metal of the magnet scarp material. The remnant alloy may be used in the manufacture of permanent magnets as well.

The following example is offered to further illustrate practice of this embodiment of the invention without limiting it:

Example

Scrap pieces of a Dy-rich permanent magnet scrap (e.g. Nd2Fe14B) was used and comprised 0.74% B, 2.02% Co, 7.94% Dy, 60.8% Fe and 18.8% Nd, where % are weight percents.

Treatment of the scrap material was conducted in relative vacuum at a treatment temperature of 1000 degrees C. in a Bi extractant. For the test, 200 grams of the scrap alloy in 2-4 mm pieces were placed in a mesh screen box of the type shown in FIG. 1A, 1B and disposed on the stopper rod or other support post. The mesh screen box was lowered into a cylindrical stainless steel crucible having a height of 5.25 inches and a diameter of 3.5 inches. A 98.5% pure Bi extractant was placed in the crucible in an amount of 1124.1 grams. The crucible was placed in an induction coil, which was energized to melt the Bi extractant and provide the above controlled treatment temperature of 1000 degrees C. where the light and heavy rare earth metals, Nd and Dy diffuse rapidly out of the scrap material into the liquid bismuth extractant. The temperature was maintained for 3 hours. Then, the induction coil was de-energized, and the resulting melted Bi extractant (Bi-RE alloy) containing the vast majority of Nd and Dy of the scrap was cast by opening a stopper rod 12 into a water-cooled copper mold M where it was solidified as an ingot under an argon environment. The table shown in FIG. 3 sets forth the results of the extraction showing recovery of Nd and Dy in the Bi-RE extractant alloy.

In particular, the table of FIG. 3 shows measured compositions of rare earth metals in initial magnet scrap and in the Bi extractant alloy after processing for 3 hours at 1000° C. The theoretical compositions listed to the right for Nd and Dy are based on the assumption that all of the Nd and Dy in the magnet scrap diffused into the Bi extractant. All compositions were measured by ICP-MS.

The cast and solidified extractant alloy can be subjected to vacuum distillation or sublimation at temperatures above 900 degrees C. and pressures less than 1 torr for a time effective to selectively remove the Bi extractant from the extractant alloy to recover the light and heavy rare earth metals for reuse in manufacture of permanent magnets.

Remaining in the mesh screen box was an iron-based remnant alloy containing a small residual amount of Nd, and Dy content of the scrap material.

Two-Step Embodiment

A two-step embodiment of the present invention involves treating a rare earth metal-bearing scrap material using a first extractant preferably selected from the Group IIA metals of the Periodic Table, more preferably Mg extractant, to extract the light rare earth metal(s) first and then using a second extractant selected from the group consisting of bismuth (Bi) and lead (Pb) to extract the heavy rare earth metal(s) from a remnant alloy.

An illustrative embodiment of the invention offered for purposes of illustration and not limitation involves first contacting the rare earth metal-bearing scrap material, such as $RE_2Fe_{14}B$ scrap that contains various amounts of Nd, Pr, and Dy, and a molten distilled magnesium metal extractant (99.5% by weight) in a common induction heated, melting vessel 10 (crucible) at controlled temperature greater than 650 degrees C. (melting temperature of Mg) but less than about 900 degrees C. The controlled temperature is selected to be a temperature where the Nd and Pr light rare earth metals diffuse rapidly into and are soluble in the molten magnesium extractant, but the Dy heavy rare earth metal exhibits little or no diffusion into or solubility in the molten magnesium extractant. The scrap material and melted magnesium extractant are contacted in the processing vessel at a first controlled temperature (e.g. 850 degrees C.) and time (1 hour) sufficient to selectively extract the light rare earth metal(s) from the scrap material into the melted magnesium extractant. The resulting melted extractant containing the vast majority of Nd and Pr can be cast into mold M with subsequent solidification in the mold yielding the first extractant alloy. The Mg extractant can be selectively removed from the extractant alloy to recover the Nd and Pr metals.

A heavy rare earth metal-enriched iron-based alloy (remnant alloy) remains in the processing vessel. The remnant alloy left in the processing vessel typically is based on (having a majority of) the transition metal of the scrap material (e.g. Fe based) and includes the heavy rare earth metal(s). The remnant alloy can include some inter-particle alloy containing the first extractant (e.g. Mg and minor amount of residual Nd and Pr).

Then, in a second step, the heavy rare earth-enriched remnant alloy and a molten second extractant selected from the group consisting of bismuth (Bi) and lead (Pb) are contacted in the same or different processing vessel at a temperature (e.g. 1000 degrees C.) and time (e.g. 3 hours) so that the heavy rare earth metal selectively diffuses into the Bi or Pb extractant and forms a second extractant alloy upon solidification. The second extractant alloy then can be subjected to vacuum distillation or sublimation to selectively remove the second extractant (e.g. Bi) to recover the heavy rare earth metal(s).

The following example is offered to further illustrate practice of this embodiment of the invention without limiting it:

Example

Scrap pieces of a Dy-rich permanent magnet scrap (e.g. Grade N35 Nd2Fe14B) can comprise 0.39% Al, 0.91% B, 4.46% Dy, 65.1% Fe, less than 0.001% Mg, 18.03% Nd, 0.007% Ni, 6.01% Pr, where % are weight percents.

Treatment of the scrap material can be conducted in relative vacuum at a treatment temperature of 850 degrees C. For each test, two hundred (200) grams of the scrap alloy in 2-4 mm pieces can be placed in a mesh screen box of the type shown in FIG. 1A, 1B and disposed on the stopper rod or other support post. The mesh screen box is lowered into a cylindrical stainless steel crucible having a height of 5.25 inches and a diameter of 3.5 inches. Two hundred (200) grams of 99.5% pure magnesium can be placed in the crucible. The crucible was placed in an induction coil, which is energized to melt the magnesium extractant and provide the above controlled treatment temperature of 850 degrees C. where the light rare earth metals, Nd and Pr, diffuse rapidly out of the scrap into the liquid magnesium extractant but where the heavy rare earth metal Dy exhibits little or no diffusion into the extractant and thus little or no solubility in the extractant. The temperature can be maintained for 1 hour. Then, the induction coil is de-energized and the resulting melted Mg extractant containing the vast majority of Nd and Pr of the scrap can be cast by opening a stopper rod 12 into a water-cooled copper mold M where it is solidified as an ingot under an argon environment. Remaining in the mesh screen box is an iron-based remnant alloy enriched in the Dy content of the scrap.

Figure 1B:
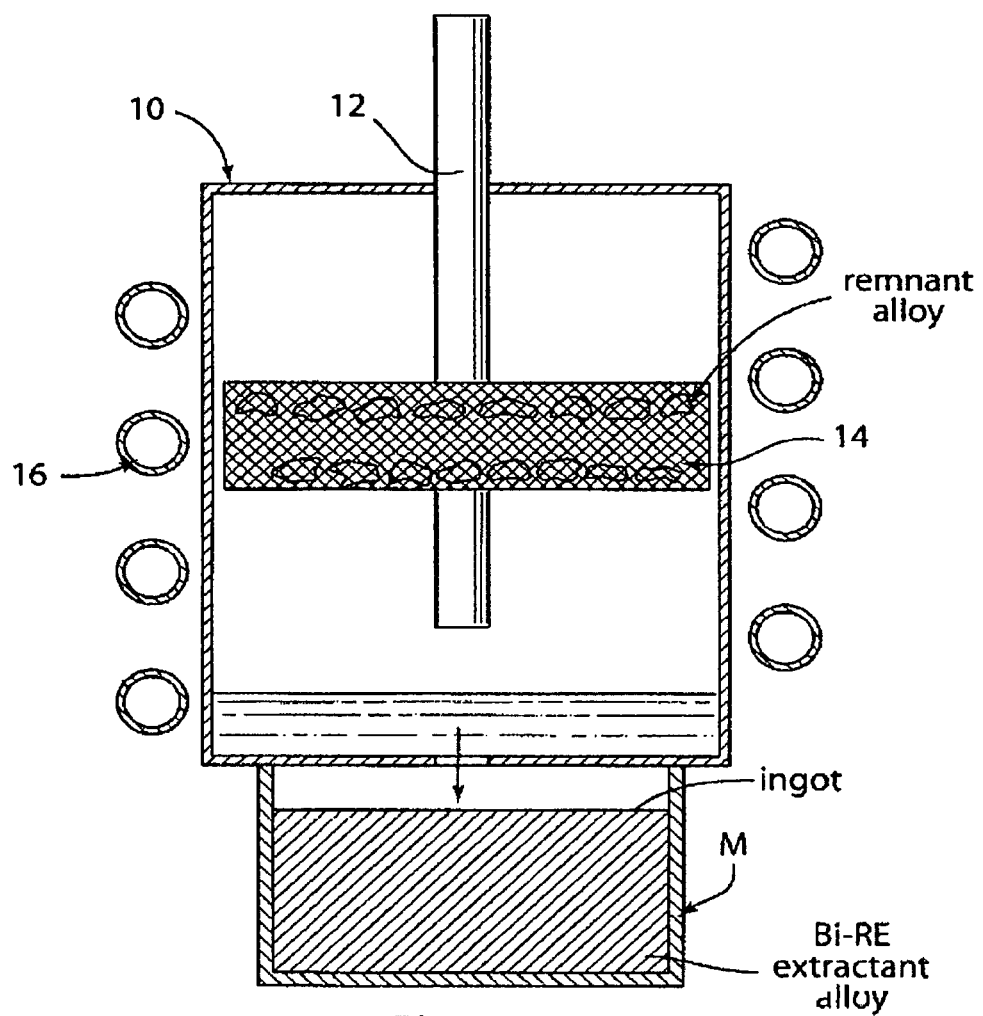

The iron-based remnant alloy can be treated in a similar manner as described above for the one-step embodiment using a Bi extractant in relative vacuum at a treatment temperature of 1000 degrees C. wherein the iron-based remnant alloy is placed in a mesh screen box of the type shown in FIG. 1A, 1B and disposed on the stopper rod or other support post. The mesh screen box is lowered into a cylindrical stainless steel crucible having a height of 5.25 inches and a diameter of 3.5 inches. The 99.5% pure Bi extractant is placed in the crucible in an appropriate amount. The crucible is placed in an induction coil, which is energized to melt the Bi extractant and provides the above controlled treatment temperature of 1000 degrees C. where the heavy rare earth (e.g. Dy) metal diffuses rapidly out of the remnant alloy into the liquid bismuth extractant. The temperature can be maintained for 3 hours. Then, the induction coil is de-energized and the resulting molten second extractant alloy (Bi containing the vast majority of Dy of the scrap material) can be cast by opening a stopper rod 12 into a water-cooled copper mold M where it is solidified as an ingot under an argon environment. The cast and solidified Bi—Dy extractant alloy can be subjected to vacuum distillation or sublimation at temperatures above 900 degrees C. and pressure less than 1 torr for a time to selectively remove the Bi from the extractant alloy to recover the Dy metal for reuse in manufacture of permanent magnets.

While the invention has been described in terms of specific embodiments thereof, it is not intended to be limited thereto but rather only to the extent set forth in the following claims.

We claim:

1. A method of treating a rare earth metal-bearing scrap material, comprising melting a metal or a metal alloy extractant comprising at least one of bismuth (Bi) and lead (Pb) to provide a liquid metallic extractant and contacting the liquid metallic extractant and the scrap material at a temperature and time to recover at least one of a light rare earth metal content and a heavy rare earth metal content of the scrap material as part of a metallic extractant alloy.

2. The method of claim 1 wherein the light rare earth metal content and the heavy rare earth metal content are recovered concurrently in a one-step process.

3. The method of claim 1 wherein the light rare earth metal content and the heavy rare earth metal content are recovered separately in sequence in different extractants in a two-step process.

4. The method of claim 1 wherein the extractant comprises at least 50% by weight Bi.

5. The method of claim 4 wherein the extractant comprises at least 75% by weight Bi.

6. The method of claim 5 wherein the extractant comprises at least 98% by weight Bi.

7. The method of claim 1 wherein the extractant comprises Bi in the temperature range of greater than 271 degrees C. to 1300 degrees C.

8. The method of claim 1 wherein the extractant alloy comprises at least one of the light rare earth metal content and the heavy rare earth metal content and at least one of Bi and Pb.

9. The method of claim 1 wherein the rare earth metal-bearing scrap material comprises a transition metal, a light rare earth metal, and a heavy rare earth metal.

10. The method of claim 1 wherein the light rare earth metal content is selected from the group consisting of Nd, Pr, Sm and Gd and the heavy rare earth metal content is selected from the group consisting of Dy, Tb, and Ho.

11. The method of claim 1 wherein the extractant alloy is subjected to vacuum distillation.

12. A method of treating a rare earth metal-bearing scrap material that comprises a transition metal, a light rare earth metal, and a heavy rare earth metal, comprising melting a metal or metal alloy extractant comprising at least one of bismuth (Bi) and lead (Pb) to provide a liquid metallic extractant and contacting the liquid metallic extractant and the scrap material at a temperature and time to recover the light rare earth metal and the heavy rare earth metal concurrently in a one-step process as a metallic extractant alloy.

13. The method of claim 12 including selectively removing the extractant from the extractant alloy to recover the light rare earth metal and the heavy rare earth metal.

14. The method of claim 12 wherein the extractant comprises at least 50% by weight Bi.

15. The method of claim 14 wherein the extractant comprises at least 75% by weight Bi.

16. The method of claim 15 wherein the extractant comprises at least 98% by weight Bi.

17. The method of claim 12 wherein the extractant comprises Bi in the temperature range of greater than 271 degrees C. to 1300 degrees C.

18. The method of claim 12 wherein the light rare earth metal content is selected from the group consisting of Nd, Pr, Sm and Gd and the heavy rare earth metal content is selected from the group consisting of Dy, Tb, and Ho.

19. A method of treating a rare earth metal-bearing scrap material that comprises a transition metal, a light rare earth metal, and a heavy rare earth metal, comprising: (a) melting a first extractant selected from the Group IIA metals of the Periodic Table and contacting the scrap material and the molten first extractant at a temperature and time to recover the light rare earth metal content as a first metallic extractant alloy, leaving a remnant alloy rich in heavy rare earth metal content; and (b) melting a second extractant selected from the group consisting of bismuth (Bi) and lead (Pb) and contacting the remnant alloy and the molten second extractant at a temperature and time to recover the heavy rare earth metal content as a second metallic extractant alloy.

20. The method of claim 19 including selectively removing the first extractant from the first extractant alloy to recover the light rare earth metal.

21. The method of claim 19 including selectively removing the second extractant from the second extractant alloy to recover the heavy rare earth metal.

22. The method of claim 19 wherein the second extractant comprises at least 50% by weight Bi.

23. The method of claim 22 wherein the second extractant comprises at least 75% by weight Bi.

24. The method of claim 23 wherein the second extractant comprises at least 98% by weight Bi.

25. The method of claim 19 wherein the first extractant comprises Mg and the second extractant comprises Bi.

26. The method of claim 19 wherein the first extractant alloy comprises the light rare earth metal and Mg.

27. The method of claim 19 wherein the second extractant alloy comprises the heavy rare earth metal and Bi.

28. The method of claim 19 wherein the light rare earth metal content is selected from the group consisting of Nd, Pr, and Gd and the heavy rare earth metal content is selected from the group consisting of Dy, Tb, and Ho.

* * * * *